United States Patent [19]
Willich et al.

[11] 3,797,818
[45] Mar. 19, 1974

[54] HYDRAULIC TELESCOPIC SHOCK ABSORBER

[75] Inventors: Jean Herbert Willich; Johannes Jasper de Baan, both of Ennepetal, Germany

[73] Assignee: Firma August Bilstein, Ennepetal-Altenvoerde, Germany

[22] Filed: Feb. 15, 1972

[21] Appl. No.: 226,534

[30] Foreign Application Priority Data
July 14, 1971 Germany............................ 2135000

[52] U.S. Cl.................... 267/122, 213/43, 267/139, 293/85
[51] Int. Cl......... B60r 19/06, F16f 5/00, F16f 9/08
[58] Field of Search.................... 213/43; 293/1, 85; 267/118, 121, 122, 136, 139

[56] References Cited
UNITED STATES PATENTS
3,568,856  3/1971  Knippel................................. 213/43
2,841,294  7/1958  Henrikson et al. .................. 213/43
3,410,416  11/1968  Peterson ............................ 213/43
2,600,060  6/1952  Lopes et al. ........................ 293/85
3,499,546  3/1970  Dilg ..................................... 213/43

Primary Examiner—Robert J. Spar
Assistant Examiner—Howard Beltran
Attorney, Agent, or Firm—Neuman, Williams, Anderson & Olson

[57] ABSTRACT

An hydraulic shock absorber for use for example in absorbing impacts on motor vehicles has a damping characteristic which is dependent on the stroke of a telescopic deformation but not on velocity of impact and the deformation is normally temporary due to restorative properties of the shock absorber.

The shock absorber basically comprises a relatively movable piston and barrel which are filled with a damping liquid and which are at least partially surrounded by resilient bellows which accommodate displaced liquid on impact.

The shock absorber includes throttling means in the form of bores and/or slots which may be located in the piston and/or in the barrel.

11 Claims, 14 Drawing Figures

HYDRAULIC TELESCOPIC SHOCK ABSORBER

FIELD OF THE INVENTION

This invention relates to a hydraulic telescopic shock absorber comprising a barrel containing damping liquid, a displaceable piston which is arranged for telescopic movement relative to the barrel, and porting means for throttling the displaced liquid.

Shock absorbers serve to absorb and dissipate the energy from shocks, for example which are exerted on vehicles in the event of impact at low speeds. Absorbing the shock must take place so that damage to the chassis does not occur and so that the shock absorber is able to be regenerated. If the shock absorber fulfils these requirements, and with a suitable construction of the impact surfaces of the vehicle, it is possible to avoid repairs for example to the headlights and the exhaust system.

DESCRIPTION OF THE PRIOR ART

Energy-dissipating shock absorbers are already known which have hollow profiles which are filled with gas or water and dissipate the impact energy by deformation or by the release of water through outlets which open in the event of impact. These shock absorbers however have progressive characteristics which are synonymous with undesired high power peaks at the beginning of the impact. Moreover, they are temperature dependent and costly, as well as being dependent in their method of working on the shape of the object encountered.

Furthermore, shock absorbers are known wherein the energy dissipation is effected by a piston compressing a silicon rubber and forcing it through piston openings, whereby the required damping effect is obtained. At the end of the piston stroke, the rubber reaches a considerable pressure which causes a restorative movement of the piston. Owing to the very high pressures, such dampers must be built with comparatively thick walls, with the result that their weight is very large. Since the piston rod must be protected against corrosion, and the medium to be compressed is costly, such shock absorbers are comparatively expensive. As opposed to hydraulic damping, such shock absorbers have the disadvantage that the damping forces are not maintained accurately enough and the force as plotted on a working diagram continuously rises so that the optimum damping, which requires a constant force, cannot be achieved.

The known hydraulic shock absorbers show a high structural expense which in the first place is made necessary by the sealing of the piston rod which enters into the working cylinder and has to be sealed at the entry point.

SUMMARY OF THE INVENTION

It is an object of the present invention to provide a telescopic shock absorber of the type first mentioned above which combines a structurally simple design with sturdiness and which functions without any sealing problems.

This is achieved in accordance with the invention by a shock absorber comprising a barrel containing damping liquid, a displaceable piston which is arranged for telescopic movement relative to the barrel and which is formed as a cylindrical tube closed at at least one end, porting means arranged to throttle the displaced liquid, and resilient bellows secured at their respective ends to the two telescoping elements, the bellows sealing off the piston and barrel without leakage, accommodating the damping liquid displaced on a compression stroke, and having a restorative action thereafter to return the displaced liquid to the piston and barrel.

It is essential to the invention that the piston is formed as a cylindrical tube which is closed at at least one end. It is thereby possible for the cylindrical tube to slide in the barrel without a separate guide for the piston being necessary. The sliding and guiding of the cylindrical tube takes place in a liquid bath so that the friction of the two telescoping parts is slight. Moreover, in this way, simple components can be used with comparatively large tolerances so that the manufacturing costs of the shock absorber can be kept low. It is furthermore of importance that the ends of the bellows are fastened to the respective two telescoping parts and can seal off these two parts without any leak. The damping liquid of the shock absorber can thus be sealed off so that any possible leakage is avoided. There is no need for corrosion protection and dirt protection of the cylindrical tube forming the piston since this tube is completely sealed in at the relevant points and can slide in the liquid. The bellows are so formed that they can accommodate the damping liquid which is compressed during the inward compression stroke and release it again under spring resilience at the end of this stroke. The shock absorber, after dissipating the impact energy, permits the damping liquid to pass back through the throttling ports and so returns to its original position by the bellows releasing the amount of liquid which they had accommodated.

Thus, essentially only three components are necessary for the shock absorber, namely the two telescoping parts and the elastic bellows. The attachment of the bellows to the telescopic parts is possible in a simple way and can if necessary be combined with the elements for incorporation of the shock absorber into a vehicle for example. It is evident that the shock absorber, due to its simple construction, is suitable not only for incorporation into vehicles but also can be used as an impact damper in many possible situations, e.g. as a railway buffer.

In a preferred embodiment of the invention, the porting means comprises bores and/or slots which throttle the liquid in dependence on stroke, such slots being provided in the piston and/or in the barrel. Such bores and/or slots enable the damping forces to be kept substantially constant in the course of a compression stroke and in this way help to achieve a dissipation of the impact energy without high power peaks being present at the beginning of the impact, which peaks, due to correspondingly high delays, can lead to the endangering of the components of the vehicle or the occupants thereof, as would be possible with a damping which is dependent on velocity. The control of the damping force can be particularly easily achieved in the desired sense by the piston having a plurality of throttling bores therethrough and spaced axially thereof in its wall which moves into the barrel on compression.

However, it is also possible to keep the damping force constant over the course of a compression stroke if the piston is provided with external slots over the entire length of that part of the piston which enters into the barrel, the width and/or depth of the slots decreasing with increasing distance from the barrel-entering end of the piston. The cross-sectional shape of the slots can be so selected that the slots can be produced as simply as possible, for example by pressing or rolling.

In a preferred embodiment, the piston has a plastics coating which is provided with throttling slots. Such plastics coverings can be manufactured easily, and also increase the ease with which the piston can slide in the barrel.

The piston is preferably formed as a tube open at the end projecting into the barrel or as a closed hollow piston. In the first case, the incorporation of further parts into the open-ended tube is comparatively simple. In the second case, one saves the amount of damping liquid whose volume corresponds to the volume of the hollow piston.

The resilience and in particular the restorative properties of the shock absorber can be controlled in a simple way if a cylindrical spring is provided which acts between the piston and the barrel.

In order to neutralise any unforeseen brief high energy peaks for the shock absorber, i.e., to be able to dissipate their energy if necessary at a later stage during the course of a compression of the telescopic parts, an excess pressure valve may be arranged parallel to the porting means. In a preferred embodiment, the excess pressure valve is a spring plate valve which at least partly blocks off an internal chamber of the piston, and the thus closed chamber is connected to a chamber enclosed by the bellows.

Depending upon the arrangement of the porting means which throttles the liquid, the valve seat of the spring plate valve may be formed as a disc and secured to the piston. If the valve seat itself carries throttling bores or slots, or throttling slots are provided in the outer surface of the piston, the spring plate valve can be fastened to or fitted into the open end of the piston which projects into the barrel.

If a gas bladder is provided within the piston and the bladder is compressible on the inward compression stroke, then this bladder can serve as a reserve of restorative power in order to compensate for any permanent deformation of the bellows which might occur during the life of the shock absorber.

According to a preferred embodiment of the invention, the bellows are fastened at one end to the outwardly facing end of the piston and at the other end are turned back and fastened to the barrel.

The bellows are preferably formed as an end stop which limits the separation of the barrel and the piston. Since the connection of the bellows to the barrel and to the piston can be completely sealed, the damping liquid is preferably inserted under excess pressure, i.e., in excess of atmospheric pressure.

A number of embodiments of the invention will now be described by way of example and with reference to the accompanying drawings.

DESCRIPTION OF THE PREFERRED EMBODIMENTS

It is to be understood that the terms "upper" and "lower" used hereinafter with reference to the drawings are indicative only of the orientation of the shock absorbers as shown in the drawings and have no limiting connotation.

Figure 1:
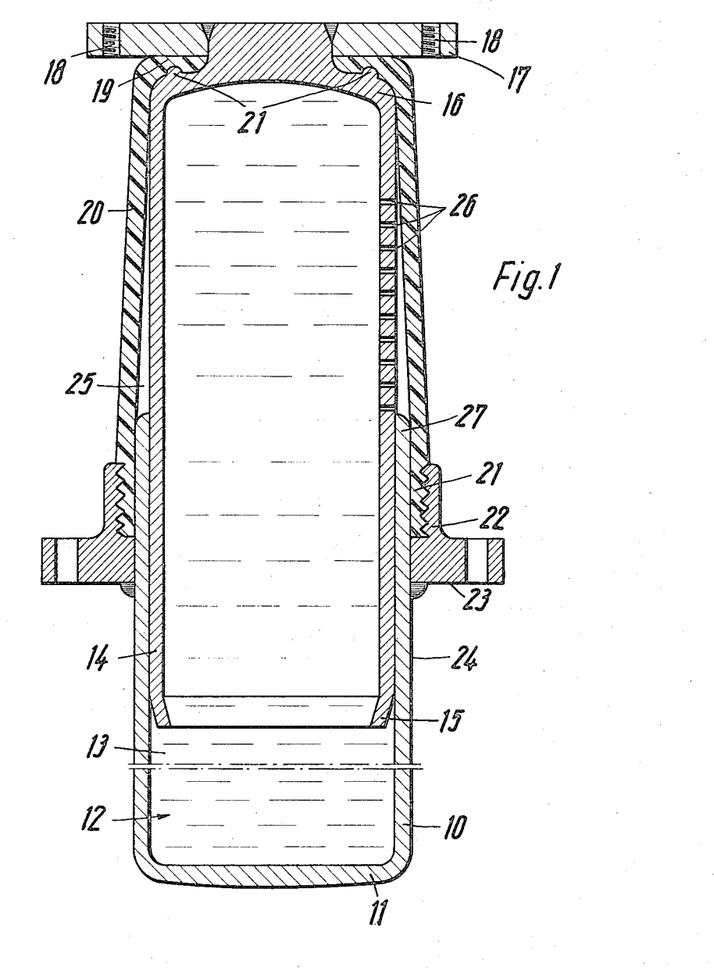
FIG. 1 illustrates a first embodiment of shock absorber having throttling ports in the piston which are masked one after another by the barrel on the inward compression stroke.

The shock absorber of FIG. 1 comprises a cylindrical barrel 10 containing a damping liquid 12 and having a closed lower end 11. The internal wall 13 of the barrel is smooth so as to permit relative sliding movement with respect to a cylindrical displaceable piston 14 which is formed as a tube closed at its end remote from the barrel end 11. The external diameter of the piston 14 is somewhat smaller than the internal diameter of the barrel 10 so that the piston can be pushed into the barrel. So that the rim of the lower or inner end of the piston 14 does not scrape on the internal surface of the barrel 10, the rim of the piston is turned inwardly around its circumference so as to be slightly inclined towards the longitudinal axis of the shock absorber. The closure of the upper end of the tubular piston is by means of an end wall 16 to which is attached a flange 17 which is provided with holes 18 for securing means for fixing the shock absorber for example to a fender or bumper of a vehicle. The flange 17 and the end wall 16 define an annular gap in which the one end 19 of resilient bellows 20 is secured. An annular bead 21 on the outside of the end wall 16 assists the sealing of the bellows the flange and the end wall. The other end 21 of the bellows 20 is firmly pressed against the outer surface 24 of the barrel 10 and is securely held by means of an annular axial sleeve 22 projecting from a flange 23 secured to the barrel 10. The flange 23 moreover serves to secure the shock absorber for example to a load-bearing part of the vehicle.

The damping liquid of the shock absorber is provided between the telescoping parts 10 and 14 and in the space 25 externally of the barrel and piston which is sealingly enclosed by the bellows 20. These bellows, which partially cylindrically enclose the piston 14 and the barrel 10, are resilient so that after any expansion they tend to retract back into the position illustrated.

They also tend to keep the telescoping parts of the shock absorber in their illustrated rest position. On compressing both the parts 10 and 14 or sliding one of these parts in or over the other, damping liquid is urged out of the cylindrical space within them and through throttling ports 26 formed through the wall of the piston 14 and issuing into the space 25. As a result, the resilient bellows 20 bulge out and expand as the two parts move telescopically into one another. As the damping liquid passes through the throttling ports 26, this dissipates the energy which caused the two telescoping parts to move relative to each other, for example the energy of an impact on the flange 17. The throttling of the damping liquid takes place on movement of the piston into the barrel so that on increasing compression more and more throttling ports are covered by the upper edge 27 of the barrel. The port area vailable through which the damping liquid can then flow is thereby reduced. Since, however, the energy is being dissipated at this time on an increasing scale, i.e., the rate of insertion of the piston is decreasing, the damping force remains approximately constant, so that one can speak of a shock absorption which is dependent on the piston stroke but which is independent of piston velocity speed.

Figure 2:
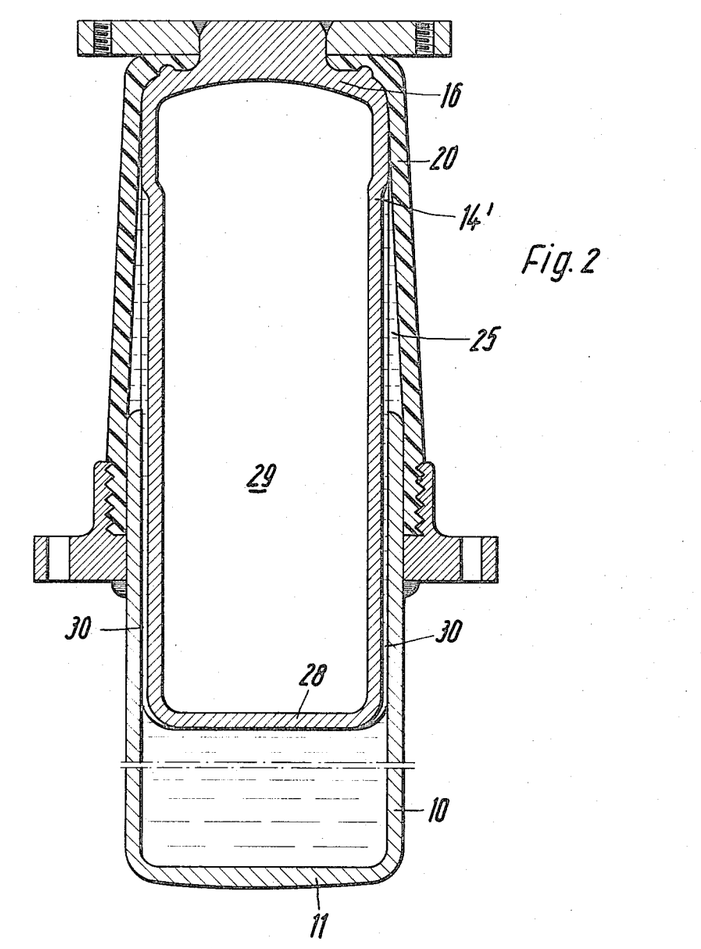
FIG. 2 illustrates an embodiment similar to FIG. 1 but having a closed hollow piston and with throttling slots which allow liquid to pass between the facing surfaces of the two telescopic parts.

The shock absorber illustrated in FIG. 2, as distinct from that illustrated in FIG. 1, has a cylindrical tube closed at both ends as the displaceable piston 14'. The outer end 16 and the inner end 28 form, together with the cylindrical tube, a liquid-tight hollow chamber 29 which contains no damping liquid. As opposed to the piston 14 of FIG. 1 which is formed as a tube opening into the barrel 10, the piston 14' can save that amount of damping liquid whose volume corresponds to the volume of the hollow piston 14'. The shock absorber thus requires a substantially smaller volume of damping liquid to fill it. The chamber 25 enclosed by the bellows 20 for receiving the liquid displaced on inward compression is connected with the interior of the barrel 10 by way of slots 30 which are provided in the surface of the piston. If the piston 14' telescopes into the barrel 10 the slots 30 in the piston throttle the damping liquid flowing into the chamber 25. The width and/or depth of the slots can be varied so that with increasing distance from the inner end 28 of the piston, the area through which the damping liquid can pass is reduced. In this way the damping of the shock absorber can be adjusted so that the damping behaviour proceeds in the above-mentioned sense in dependence on the piston stroke. Obviously, the length of the flow path through the slots 30, which increases on compression, operates in the sense of providing the desired damping dependent on piston stroke.

Figure 3A:
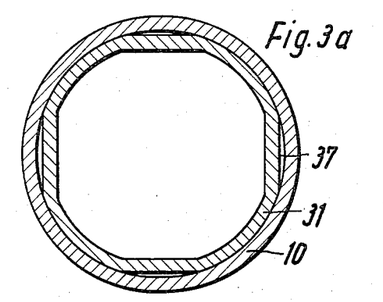
FIGS. 3a to 3f are severally cross-sectional, plan, and longitudinal sectional views of a number of alternative forms of slotted piston.
Figure 3B:
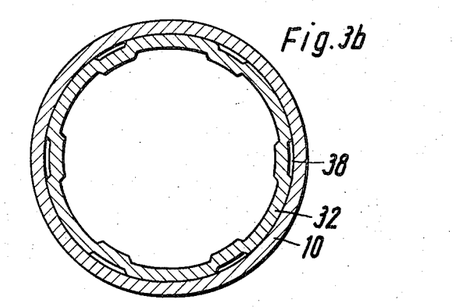
Figure 3C:
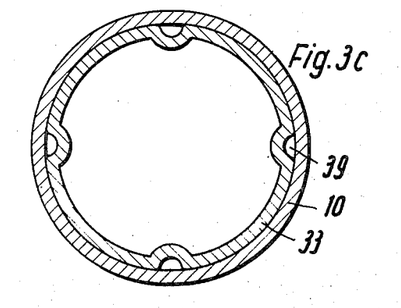
Figure 3D:
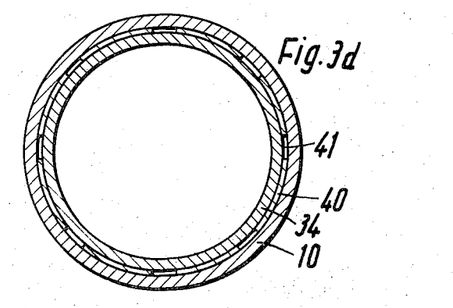

FIG. 3a is a cross-sectional view of a piston 31 within a barrel 10, the piston being movable perpendicular to the plane of illustration and having four slots 37 which are formed by flattening the piston from its circular cylindrical cross-sectional form at pairs of opposed sides. The six slots 38 in the piston 32 of FIG. 3b and the four slots 39 in the piston 33 of FIG. 3c may either be formed during manufacture of the piston element or at a later date, for example by rolling. The piston 34 illustrated in FIG. 3d has an overlaid coating 40 of a plastics material which fills the annular space between the piston and the barrel 10 apart from the six slots 41 for the passage of the damping liquid. The slots 41 are provided in the outer surface of the coating 40 and form recesses therein if the coating is secured in a suitable manner to the piston. The interchangeability of the coating means that it is possible to alter the damping behaviour of the shock absorber after manufacture without any special expense.

Figure 3E:
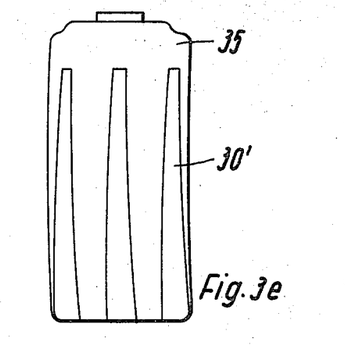
Figure 3F:
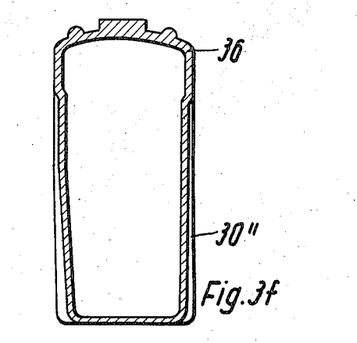

The pistons 35 and 36 of FIGS. 3e and 3f are designed as hollow pistons and each have several slots 30', 30" respectively which extend from the actively telescoping end of the piston over a substantial part of the piston length. In the case of FIG. 3e the width of the slots 30', and in the case of FIG. 3f the depth of the slots 30", decreases going away from the actively telescoping piston end, so that the flow passage area for damping liquid is reduced with increasing depth of insertion of the piston in the barrel.

Figure 4:
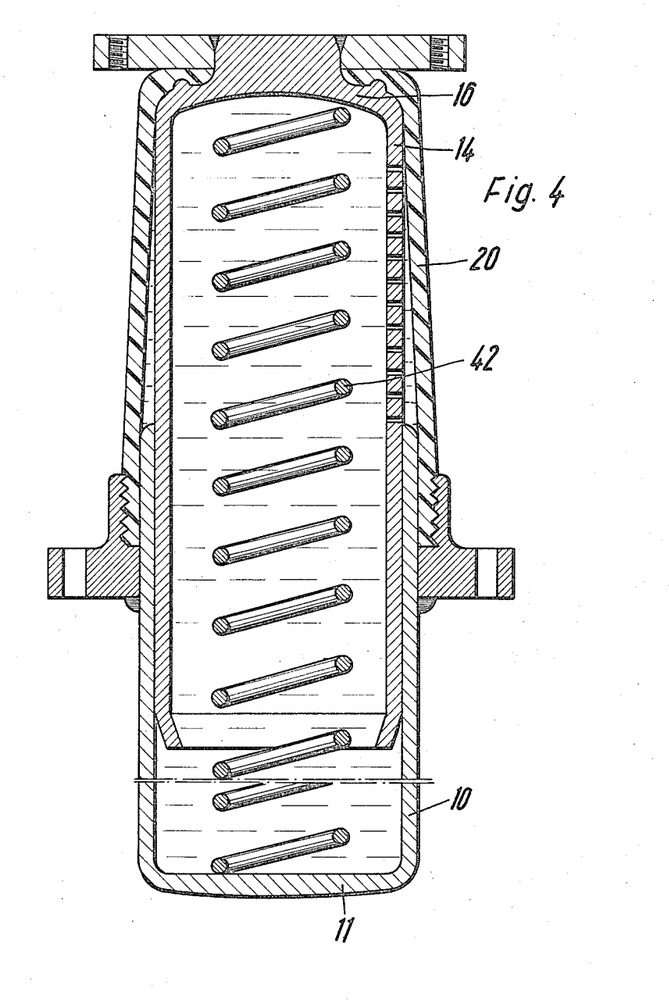
FIG. 4 illustrates an embodiment similar to FIG. 1 but with a cylindrical spring which additionally acts between the piston and the barrel.

The telescopic shock absorber illustrated in FIG. 4 has a piston 14 which is open at one end and has its open end projecting into the barrel 10. Moreover, the design of the shock absorber corresponds to that of FIG. 1. A cylindrical spring 42 however is located in the hollow chamber formed within the two telescoping parts, the spring seating at the one end against the inside of the upper end wall 16 and at the other end against the lower end 11. On movement of the piston into the barrel the spring 42 is compressed, and after dissipation of the impact energy it can urge the two telescopic parts outwardly away from each other in accordance with its spring characteristic. The cylindrical spring 42 is only to be thought of as an additional part in the shock absorber. It is evident however that it can also produce the total restoring force if the shock absorber is not designed with any inherent restorative action, i.e., if the resilient bellows 20 do not have the necessary restorative properties. The use of such an additional spring is not restricted to a cylindrical tubular piston closed at only one end, but can be used for example also between the base 11 and the inner end 28 of the piston 14' of FIG. 2.

Figure 5:
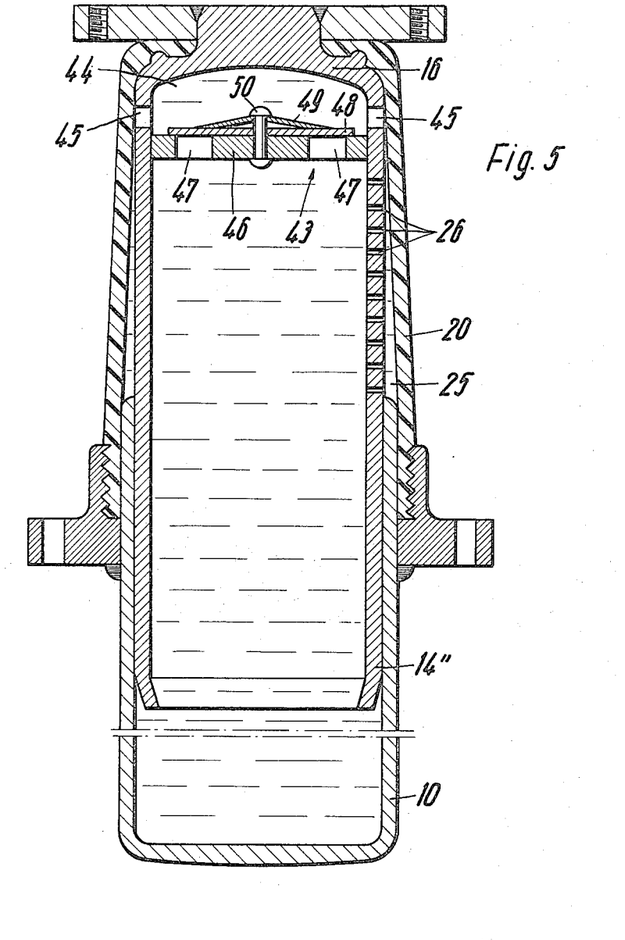
FIGS. 5 and 6 illustrate shock absorbers with excess pressure valves arranged parallel to the throttling ports for the liquid.
Figure 6:
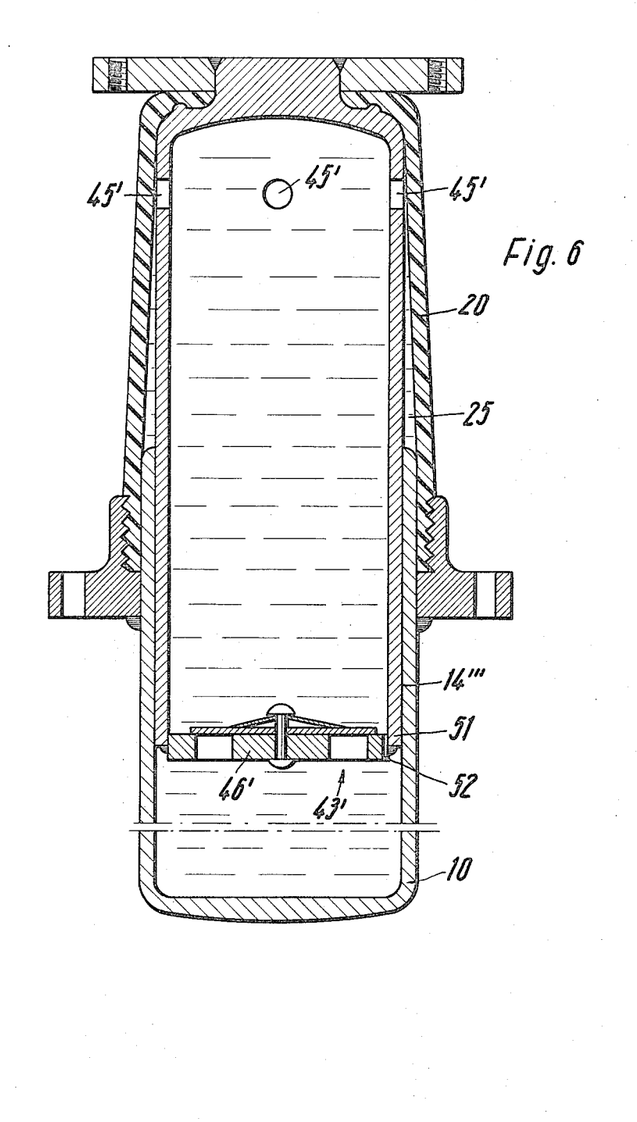

FIGS. 5 and 6 show shock absorbers which each include a barrel 10 and a displaceable piston 14" and 14'" respectively which is telescopically movable into the associated barrel. The resilient bellows 20, and also the attachment points of the shock absorber, are constructed as in the embodiment of FIG. 1. According to FIG. 5, an excess pressure valve 43 is mounted above and parallel to the throttling ports 26 and closes off the upper part 44 of the inner chamber beneath the outer end wall 16 of the piston from the lower part thereof comprising the interior of the barrel. The upper part 44 is connected to the encircling chamber 25 by way of holes 45. The excess pressure valve 43 consists of an apertured plate 46 fastened in the piston, the apertures 47 being covered by a spring plate 48 which in turn is braced by a spring 49 secured on a pin 50 through the plate 46.

With the excess pressure valve 43' illustrated in FIG. 6, the plate 46' is attached to the lower rim 51 of the piston 14'" where it opens into the barrel. Apart from an additional slot 52 the excess pressure valve 43' is designed like the valve 43 of FIG. 5. The slot 52 forms a passage for the liquid when the piston 14'" moves telescopically into the barrel. The damping liquid then flowing into the interior of the piston flows through the holes 45' into the chamber 25. In this case, the shock absorber has a damping action which is dependent on velocity since the throttling passage area remains constant irrespective of the depth of insertion of the piston.

Obviously, the slot 52 could be omitted and throttling slots like or similar to FIGS. 3a to 3f could be provided as an alternative in the outer wall of the piston 14'''. It is easier however to secure the excess pressure valve to the open end of the piston.

Figure 7:
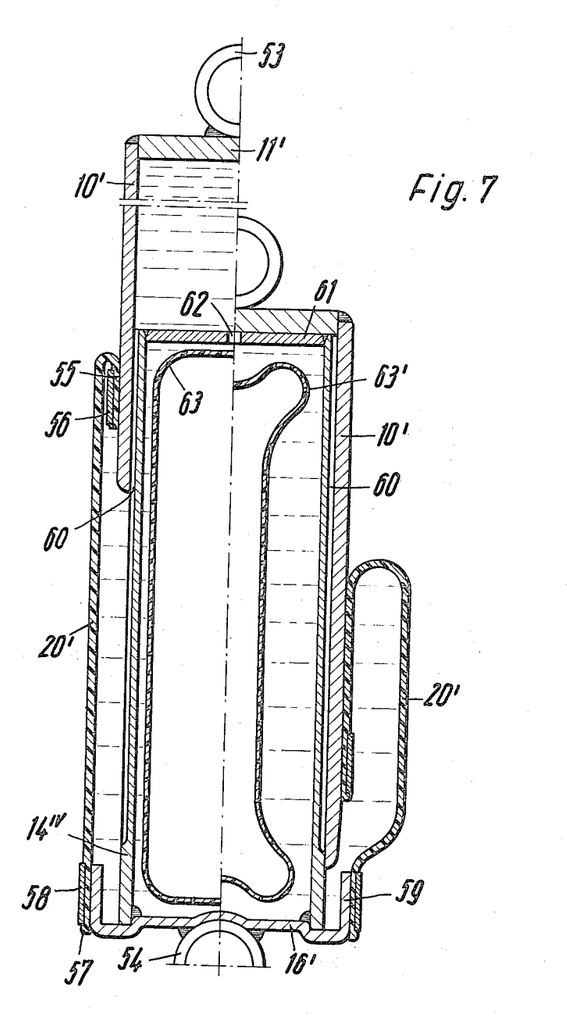
FIG. 7 illustrates a shock absorber with a different means of attachment of the bellows and with a gas bladder inside the piston.

The left-hand half of the shock absorber illustrated in FIG. 7 is shown extended whilst the right-hand half of the shock absorber is shown fully compressed. The shock absorber comprises the barrel 10' with the end 11' thereof and a mounting eyelet 53 secured thereto. The piston 14$^{IV}$, which is closed at its outwardly facing end by an end wall 16' which carries a mounting eyelet 54, can move telescopically into the barrel. The resilient bellows 20' gave their one end 55 turned back to abut the barrel and the end is fastened thereto by a clamping ring 56. The other end 57 of the bellows is fastened by a clamping ring 58 to an axial annular flange 59 of the end wall 16', the flange surrounding the piston with a suitable distance therebetween. On the inward compression stroke, the resilient bellows 20' are rolled up and simultaneously expanded in the manner of a rolling bellows, the bellows being designed so that the external configuration remains cylindrical. This is achieved by a special fabric insert. It absorbs the damping liquid which has been forced through the throttling slots 60 or throttling ports.

The inwardly facing end of the piston is closed by an end wall 61 provided with a central bore 62. A gas bladder 63 is located inside the piston and can be compressed during the inward stroke, for example as shown at 63' in the right-hand half of FIG. 7. The compressed gas volume forms a spring reserve in the event that the restorative capacity of the bellows 20' fades during the life of the shock absorber. On the expansion stroke, due to the reduction in the pressure on the gas volume, liquid passes from the interior of the piston through the bore 62 back to the barrel 10'.

The bellows are designed as the end stop limiting the outward relative movement of the barrel and the piston, so that the actual length of the bellows, corresponding to the length shown in the left-hand half of FIG. 7, determines the maximum extension of the shock absorber.

Figure 8:
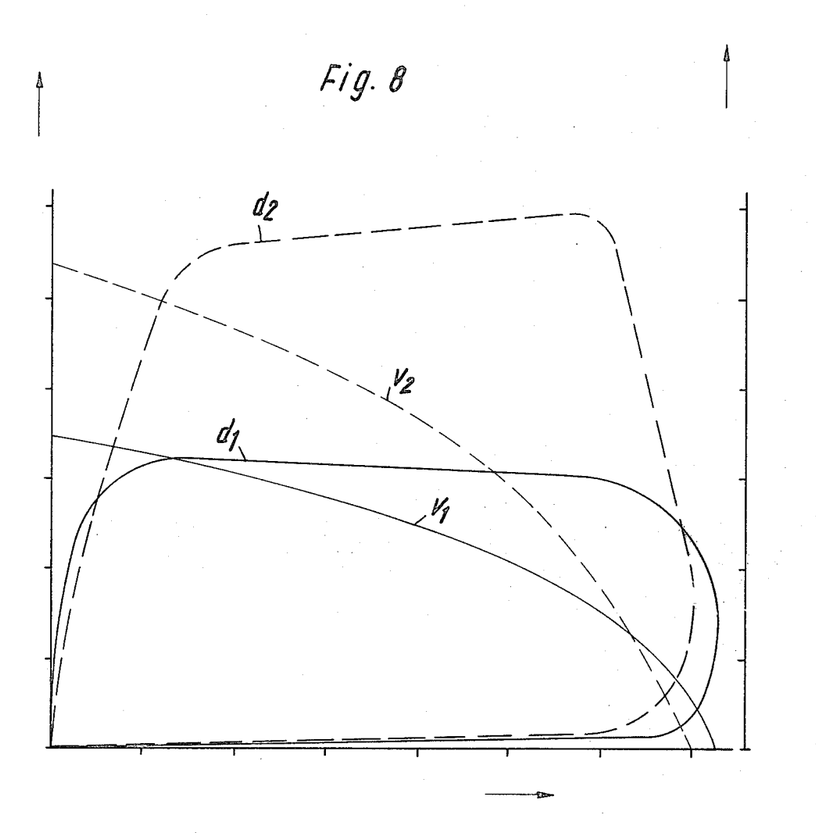
FIG. 8 is a working diagram which shows a plot of (a) the damping or restoring force and of (b) the velocity of an object which strikes the shock absorber, against the inward and outward stroke of the shock absorber; and, FIG. 9 is a schematic view showing a shock absorber mounted on the fender or bumper of a vehicle.

FIG. 8 graphically plots (a) the damping power of the shock absorber and (b) the velocity of an object striking the shock absorber against the stroke of the shock absorber, for two different impact speeds. The curves $d_1$, $v_1$ for the first impact speed are drawn in solid outline, whilst those $d_2$, $v_2$ for the second impact speed are shown in broken lines. The velocity curves $v_1$, $v_2$ are drawn as relatively thin lines whilst the damping force curves $d_1$, $d_2$ are drawn as relatively thick lines. From the diagram it is apparent that the velocity of the impinging object decreases gradually and evenly from the impact velocity to zero so that the braked object comes to a halt with almost constant deceleration. From the paths of the damping force curves $d_1$, $d_2$, it is apparent that after an initial rise the damping force remains essentially constant and falls rapidly shortly before the end of the inward compression stroke.

Figure 9:
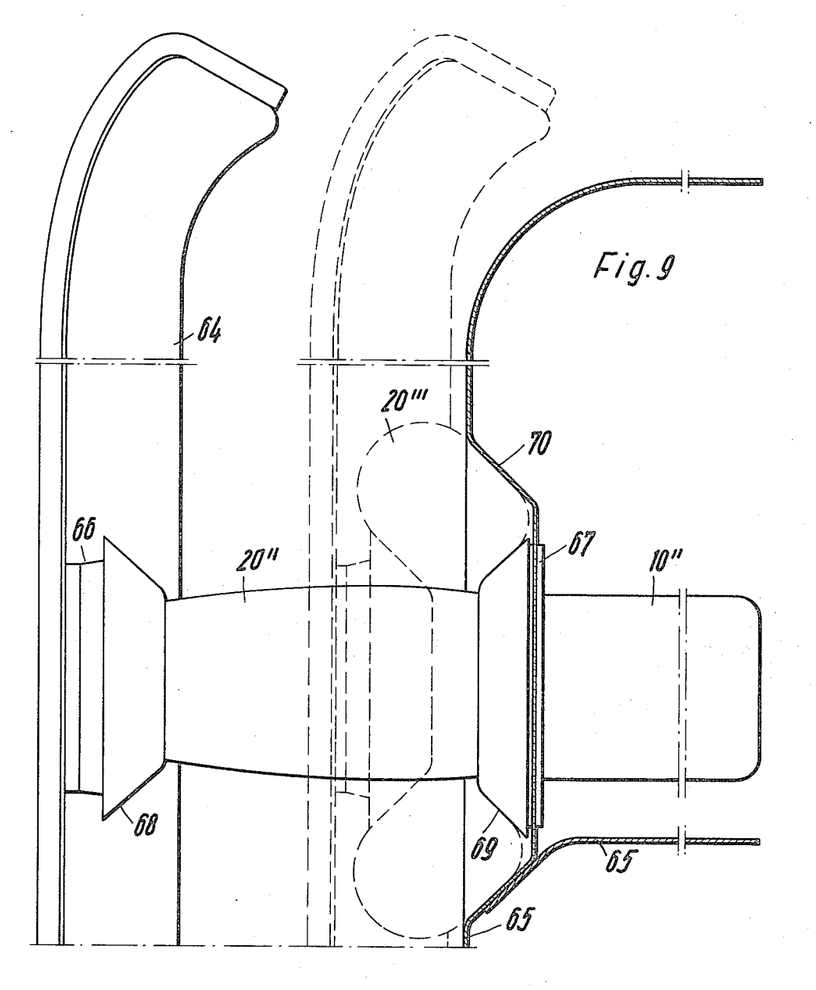

In FIG. 9, the shock absorber is shown attached at one end to a fender or bumper 64 of a vehicle and at the other end to a load-bearing part 65 of the vehicle. The mounting is accomplished by means of flanges 66, 67 having sloping faces 68, 69 which face the resilient bellows 20'' and are inclined in order that the bellows are not harmed on compression of the shock absorber. This danger is particularly apparent when the bellows assume the position 20''', i.e., when the piston, which in this illustration is enclosed by the bellows and is therefore not visible, is within the barrel 10''. An annular sloping surface 70 of the vehicle around the area of the shock absorber likewise lessens the danger of damage to the bellows.

The slots or ports which form a passage for the damping liquid need not necessarily be provided in the piston. Indeed, it is possible to provide them in the barrel. Thus, it is immaterial in the shock absorber of FIG. 6, whether the slots are arranged in the piston 14''' or in the barrel 10. It is also possible to provide throttling ports in the barrel 10 provided that the liquid flowing therethrough can be taken up by the bellows. This can best be achieved if the bellows are made longer than shown in FIG. 6. For example, the bellows could cover both telescoping parts between their respective outwardly facing ends.

We claim:

1. A hydraulic shock absorber comprising a cylindrical barrel containing a damping liquid; a reciprocally movable piston telescopically receivable in said barrel and comprising a cylindrical tube closed at at least one end, the telescopic engagement between said barrel and tube being such that the barrel inner cylindrical surface and the tube outer cylindrical surface are in slidable engagement where telescopically associated, whereby said barrel guides said piston in the course of its reciprocal movement; said piston outer surface having longitudinal slots on at least that part which enters said barrel, the sectional area of the slots decreasing with increasing distance from the barrel-entering end of the piston; resilient bellows secured at opposite end portions to spaced-apart portions of said barrel and piston, the inner surface portions of said bellows and outer surface portions of said barrel and piston defining a variable volume bellows chamber between the points of bellows attachment to said piston and barrel; said bellows preventing leakage of the damping fluid from said piston and barrel and accommodating damping liquid displaced during a compression stroke in which said piston is telescopically moved into said barrel by bulging outwardly during said stroke; said longitudinal slots effecting liquid communication between the variable volume chamber defined by the telescoping members and said variable volume bellows chamber and controlling the rate of displaced damping fluid passage into said bellows chamber as said piston telescopically moves into said barrel during a compression stroke; said bellows having a resiliency adequate to return the displaced liquid to said telescoping members following the compression stroke.

2. The shock absorber of claim 1 in which said damping liquid engages the sliding surfaces of said barrel and piston whereby said surfaces are lubricated by said damping liquid.

3. A shock absorber according to claim 1 in which said longitudinal slots are formed in a plastic covering disposed on the outer periphery of said piston.

4. A shock absorber according to claim 1, wherein the piston is a tube open only at the end entering into the barrel.

5. A shock absorber according to claim 4, wherein a cylindrical restoring spring is provided to act between the piston and the barrel, engaging opposed end surfaces thereof.

6. A shock absorber according to claim 1, wherein the piston is a closed hollow piston.

7. A shock absorber according to claim 1, having an excess pressure valve, said valve comprising a loaded spring plate which at least partly blocks off an internal chamber of the piston, and the thus closed chamber is connected to a chamber enclosed by the bellows.

8. A shock absorber according to claim 1, wherein a gas bladder which is compressible during a compression stroke is provided within the piston.

9. A shock absorber according to claim 1, wherein the resilient bellows is fastened at one end to one exterior end of the piston and at the other end is turned back and fastened to an exterior barrel portion.

10. A shock absorber according to claim 1, wherein the bellows act as a stop means for limiting the separation of the barrel and the piston.

11. A shock absorber according to claim 1, wherein the damping liquid is normally under a pressure in excess of atmospheric pressure.

* * * * *